(12) United States Patent
McCormick et al.

(10) Patent No.: US 8,484,961 B2
(45) Date of Patent: Jul. 16, 2013

(54) VACUUM ACCUMULATOR SYSTEM AND METHOD FOR REGENERATIVE BRAKING SYSTEM

(75) Inventors: John Phillip McCormick, Milford, MI (US); Gunnar Ross, Livonia, MI (US); Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 477 days.

(21) Appl. No.: 12/421,895

(22) Filed: Apr. 10, 2009

(65) Prior Publication Data

US 2010/0257852 A1    Oct. 14, 2010

(51) Int. Cl.
*F16D 31/02*    (2006.01)
(52) U.S. Cl.
USPC .......................................................... 60/397

(58) Field of Classification Search
USPC .......................................................... 60/397
See application file for complete search history.

(56) References Cited

U.S. PATENT DOCUMENTS

| | | | |
|---|---|---|---|
| 2,705,870 A * | 4/1955 | Holton | 60/397 |
| 4,730,999 A * | 3/1988 | Tsukuda et al. | 60/397 |
| 4,738,112 A | 4/1988 | Nomura et al. | |
| 5,910,098 A * | 6/1999 | Harima | 60/397 |
| 6,273,048 B1 | 8/2001 | Kargilis | |
| 6,301,883 B1 | 10/2001 | Fulks et al. | |
| 6,863,048 B2 | 3/2005 | Burkhard et al. | |
| 6,955,406 B2 | 10/2005 | Blue | |
| 2006/0158028 A1 | 7/2006 | Ichikawa | |

* cited by examiner

*Primary Examiner* — F. Daniel Lopez
(74) *Attorney, Agent, or Firm* — David Kelley, Esq.; Tung & Associates

(57) ABSTRACT

A vacuum accumulator system includes a booster, a vacuum accumulator disposed in fluid communication with the booster and an engine disposed in fluid communication with the vacuum accumulator.

10 Claims, 2 Drawing Sheets

VACUUM ACCUMULATOR SYSTEM AND METHOD FOR REGENERATIVE BRAKING SYSTEM

TECHNICAL FIELD OF THE INVENTION

The present disclosure relates to regenerative braking systems. More particularly, the present disclosure relates to a vacuum accumulator system and method in which vacuum pump energy consumption is reduced by storing and using excess engine vacuum pressure in a regenerative braking system.

BACKGROUND OF THE INVENTION

To improve fuel economy, some types of vehicles such as hybrid electric vehicles (HEVs) may provide regenerative (regen) braking, in which kinetic energy is converted by an electric machine into storable energy during braking and then made available for propulsion. In regenerative braking systems, a booster may use vacuum pressure which is generated by a vacuum pump to increase mechanical regenerative braking power. The vacuum pump used in a regenerative braking system, however, may consume unacceptable quantities of energy. Therefore, a vacuum accumulator system and method is needed in which the run time of a vacuum pump, and consequently, energy consumption of the pump, is reduced by the storage and use of excess engine vacuum pressure to augment the vacuum pressure which is distributed to the booster in a regenerative braking system.

SUMMARY OF THE INVENTION

The present disclosure is generally directed to a vacuum accumulator system. An illustrative embodiment of the vacuum accumulator system includes a booster, a vacuum accumulator disposed in fluid communication with the booster and an engine disposed in fluid communication with the vacuum accumulator.

The present disclosure is further generally directed to a vacuum accumulator method. An illustrative embodiment of the vacuum accumulator method includes operating an engine, storing and accumulating excess engine vacuum pressure from the engine, operating a booster and distributing the excess engine vacuum pressure from the engine to the booster.

BRIEF DESCRIPTION OF THE DRAWINGS

The disclosure will now be made, by way of example, with reference to the accompanying drawings, in which.

DETAILED DESCRIPTION OF THE PREFERRED EMBODIMENT

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. Furthermore, there is no intention to be bound by any expressed or implied theory presented in the preceding technical field, background, brief summary or the following detailed description.

Figure 1:
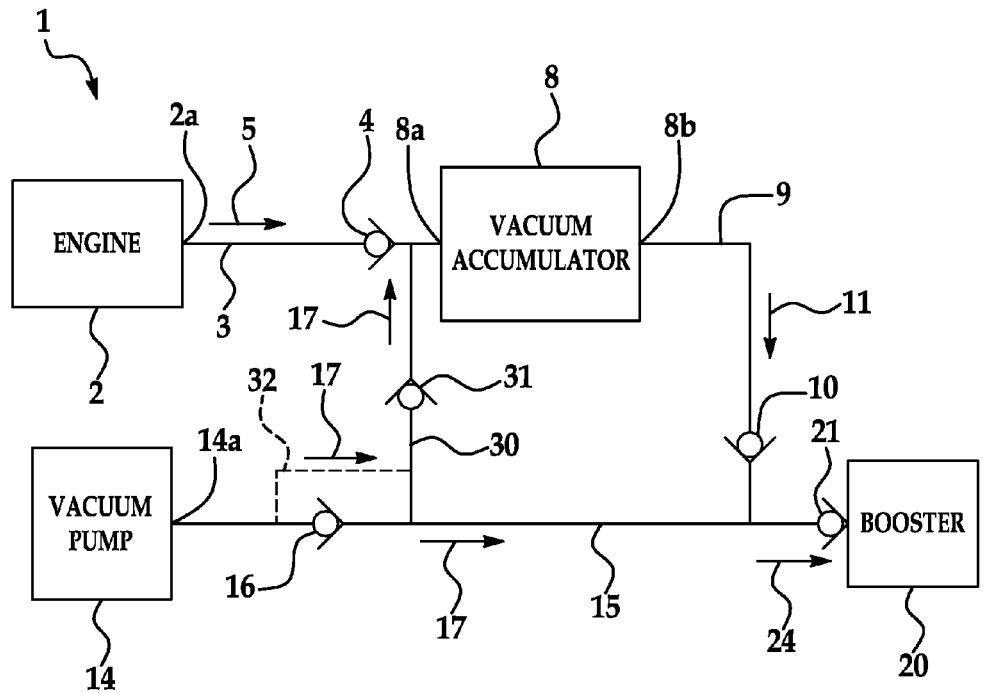
FIG. 1 is a block diagram of an illustrative embodiment of the vacuum accumulator system for regenerative braking power.

Referring initially to FIG. 1, an illustrative embodiment of the vacuum accumulator system is generally indicated by reference numeral 1. The vacuum accumulator system 1 includes an engine 2 which may be that of a hybrid electric vehicle (HEV), for example and without limitation. The engine 2 has a vacuum outlet 2a. An engine vacuum conduit 3 is disposed in fluid communication with the vacuum outlet 2a of the engine 2 and is adapted to transfer engine vacuum pressure 5 from the engine 2 during operation of the engine 2. The engine vacuum pressure 5 may be generated in the intake manifold (not shown) of the engine 2 during operation of the engine 2.

A vacuum accumulator 8 has an accumulator inlet 8a which is disposed in fluid communication with the engine vacuum conduit 3. An accumulator vacuum conduit 9 is disposed in fluid communication with an accumulator outlet 8b of the vacuum accumulator 8. A booster 20 is disposed in fluid communication with the accumulator vacuum conduit 9. In some applications, the booster 20 may be part of a regenerative braking system (not shown) of an HEV or other vehicle. The vacuum accumulator 8 is adapted to store and accumulate the engine vacuum pressure 5 which is received from the engine 2 through the engine vacuum conduit 3 during operation of the engine 2. Under circumstances in which the booster 20 requires booster vacuum pressure 24 for operation, the accumulator vacuum conduit 9 is adapted to distribute accumulator vacuum pressure 11 from the accumulator outlet 8b of the accumulator 8 to the booster 20. An engine vacuum conduit check valve 4 may be provided in the engine vacuum conduit 3 to prevent dissipation of accumulator vacuum pressure 11 in the vacuum accumulator 8 through the engine vacuum conduit 3. A vacuum accumulator check valve 10 may be provided in the accumulator vacuum conduit 9 to prevent dissipation of booster vacuum pressure 24 in the booster 20 through the accumulator vacuum conduit 9.

A vacuum pump 14 has a vacuum pump outlet 14a which is connected to the booster 20 through a pump vacuum conduit 15. A booster check valve 21 may be provided at the connecting interface between the pump vacuum conduit 15 and the booster 20 maintain vacuum pressure in the booster 20 in the event that the pump vacuum conduit 15 is inadvertently disconnected from the booster 20. The pump vacuum conduit 15 is adapted to distribute pump vacuum pressure 17 from the vacuum pump outlet 14a of the vacuum pump 14. The accumulator vacuum conduit 9 may be connected to the pump vacuum conduit 15. In the accumulator vacuum conduit 9, the accumulator vacuum pressure 11 from the vacuum accumulator 8 may augment the pump vacuum pressure 17 from the vacuum pump 14 to form the booster vacuum pressure 24. A vacuum accumulator check valve 10 may be provided in the accumulator vacuum conduit 9 to prevent dissipation of the accumulator vacuum pressure 11 in the accumulator vacuum conduit 9. A vacuum pump check valve 16 may optionally be provided in the pump vacuum conduit 15 to prevent dissipation of the pump vacuum pressure 17 in the pump vacuum conduit 15.

In some embodiments, a connecting vacuum conduit 30 may optionally connect the pump vacuum conduit 15 to the engine vacuum conduit 3. A bypass conduit 32 (shown in phantom) may optionally connect the pump vacuum conduit 15, at a point between the vacuum pump outlet 14a and the vacuum pump check valve 16, to the connecting vacuum conduit 30. A connecting conduit check valve 31 may be provided in the connecting vacuum conduit 30 to prevent dissipation of pump vacuum pressure 17 in the connecting vacuum conduit 30. Accordingly, multiple configurations of the vacuum accumulator system 1 are possible with regard to the presence or absence of the connecting conduit check valve 31 in the connecting conduit 30 and/or the vacuum pump check valve 16 in the pump vacuum conduit 15. In a first configuration, both the vacuum pump check valve 16 and the connecting conduit check valve 31, with the connecting conduit 30 and the bypass conduit 32, may be omitted from the vacuum accumulator system 1. In a second configuration, the vacuum pump check valve 16 may be provided in the pump vacuum conduit 15 while the connecting conduit check valve 31, the connecting conduit 30 and the bypass conduit 32 may be omitted from the vacuum accumulator system 1. In a third configuration, the vacuum pump check valve 16 may be omitted from the pump vacuum conduit 15 while the connecting vacuum conduit 30 and the connecting conduit check valve 31 may be provided in the vacuum accumulator system 1. In a fourth configuration, both the vacuum pump check valve 16 may be provided in the pump vacuum conduit 15 and the connecting conduit check valve 31 may be provided in the connecting vacuum conduit 30, while the bypass conduit 32 connects the pump vacuum conduit 15 to the connecting vacuum conduit 30 at a point between the vacuum pump outlet 14a of the vacuum pump 14 and the vacuum pump check valve 16. In a fifth configuration, both the vacuum pump check valve 16 may be provided in the pump vacuum conduit 15 and the connecting conduit check valve 31 may be provided in the connecting vacuum conduit 30, while the bypass conduit 32 is omitted; in that case, the connecting vacuum conduit 30 is connected to the pump vacuum conduit 15 between the vacuum pump check valve 16 and the booster check valve 21.

In typical operation of the vacuum accumulator system 1, during operation of the engine 2, engine vacuum pressure 5 is applied to the vacuum accumulator 8 through the engine vacuum conduit 3. Throughout operation of the engine 2, the vacuum accumulator 8 stores and accumulates the engine vacuum pressure 5, forming the accumulator vacuum pressure 11. The accumulator vacuum conduit 9 distributes the accumulator vacuum pressure 11 from the accumulator outlet 8b of the accumulator 8 to the pump vacuum conduit 15. Under circumstances in which the booster 20 requires booster vacuum pressure 24 for operation of the regeneration braking system (not shown), the vacuum pump 14 may be operated to generate the pump vacuum pressure 17 which is added to the accumulator vacuum pressure 11 from the accumulator vacuum conduit 9 in the pump vacuum conduit 15. The resulting booster vacuum pressure 24 is applied to the booster 20 through the terminal segment of the accumulator vacuum conduit 9. Because the booster vacuum pressure 24 includes both the accumulator vacuum pressure 11 which is received from the vacuum accumulator 8 and the pump vacuum pressure 17 which is received from the vacuum pump 14 (and may further include engine vacuum pressure 5 from the connecting vacuum conduit 30), the booster 20 need not be limited to operation by the pump vacuum pressure 17. Thus, the operational run time of the vacuum pump 14 may be reduced in order to conserve power while maintaining the necessary booster vacuum pressure 24 for optimum operation of the booster 20. Furthermore, the accumulator vacuum pressure 11 from the vacuum accumulator 8 may be available under circumstances in which the engine 2 is turned off. In applications in which the vacuum pump check valve 16 is provided in the pump vacuum conduit 15 and the connecting vacuum conduit 30, the connecting conduit check valve 31 and the bypass conduit 32 are omitted from the vacuum accumulator system 1, the vacuum pump check valve 16 may prevent dissipation of vacuum pressure in the pump vacuum conduit 15.

In applications in which the vacuum pump check valve 16 is omitted from the pump vacuum conduit 15, the connecting conduit 30 connects the pump vacuum conduit 15 to the engine vacuum conduit 3 and the connecting conduit check valve 31 is provided in the connecting conduit 30, the connecting conduit check valve 31 may open when the pump vacuum pressure 17 in the connecting vacuum conduit 30 exceeds a predetermined value (such as 0.7 bar, for example and without limitation). The connecting vacuum conduit 30 with connecting conduit check valve 31 may enable the vacuum pump 14 to evacuate the accumulator 8 after the pump vacuum pressure 17 which is initially applied to the booster 20 has reached the predetermined value (such as 0.7 bar, for example and without limitation).

In applications in which the bypass conduit 32 connects the connecting conduit 30 with the pump vacuum conduit 15 at a point which is between the vacuum pump outlet 14a and the vacuum pump check valve 16, pump vacuum pressure 17 may be distributed from the pump vacuum conduit 15 to the connecting vacuum conduit 30 upstream of the vacuum pump check valve 16. In applications in which the bypass conduit 32 is omitted, the pump vacuum pressure 17 leaves the pump vacuum conduit 15 downstream of the vacuum pump check valve 16.

Figure 2:
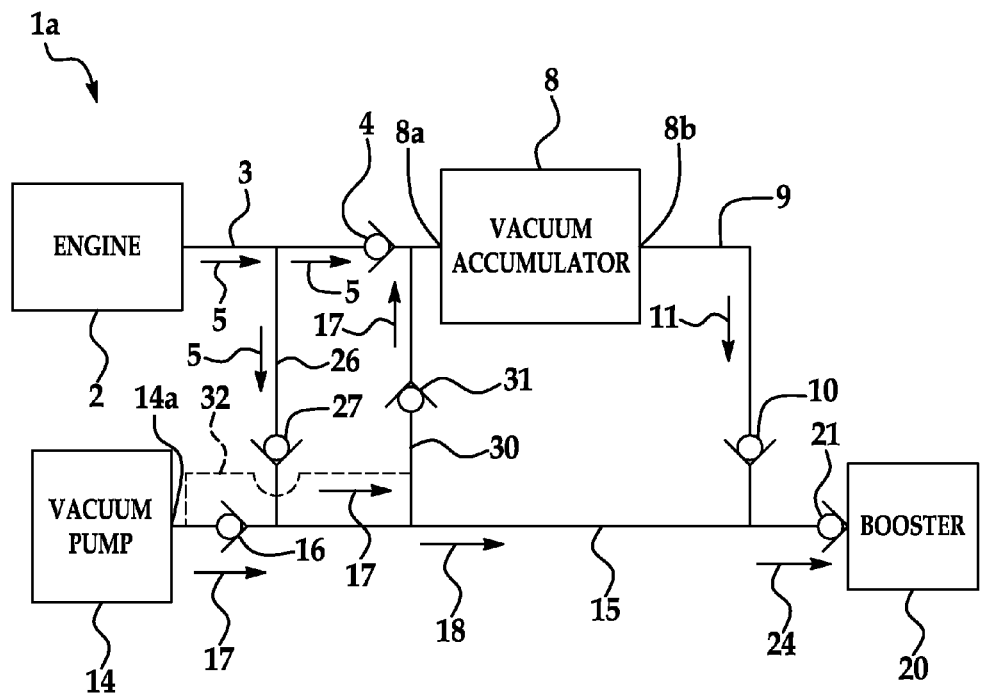
FIG. 2 is a block diagram of an alternative illustrative embodiment of the vacuum accumulator system for regenerative braking power.
Figure 3:
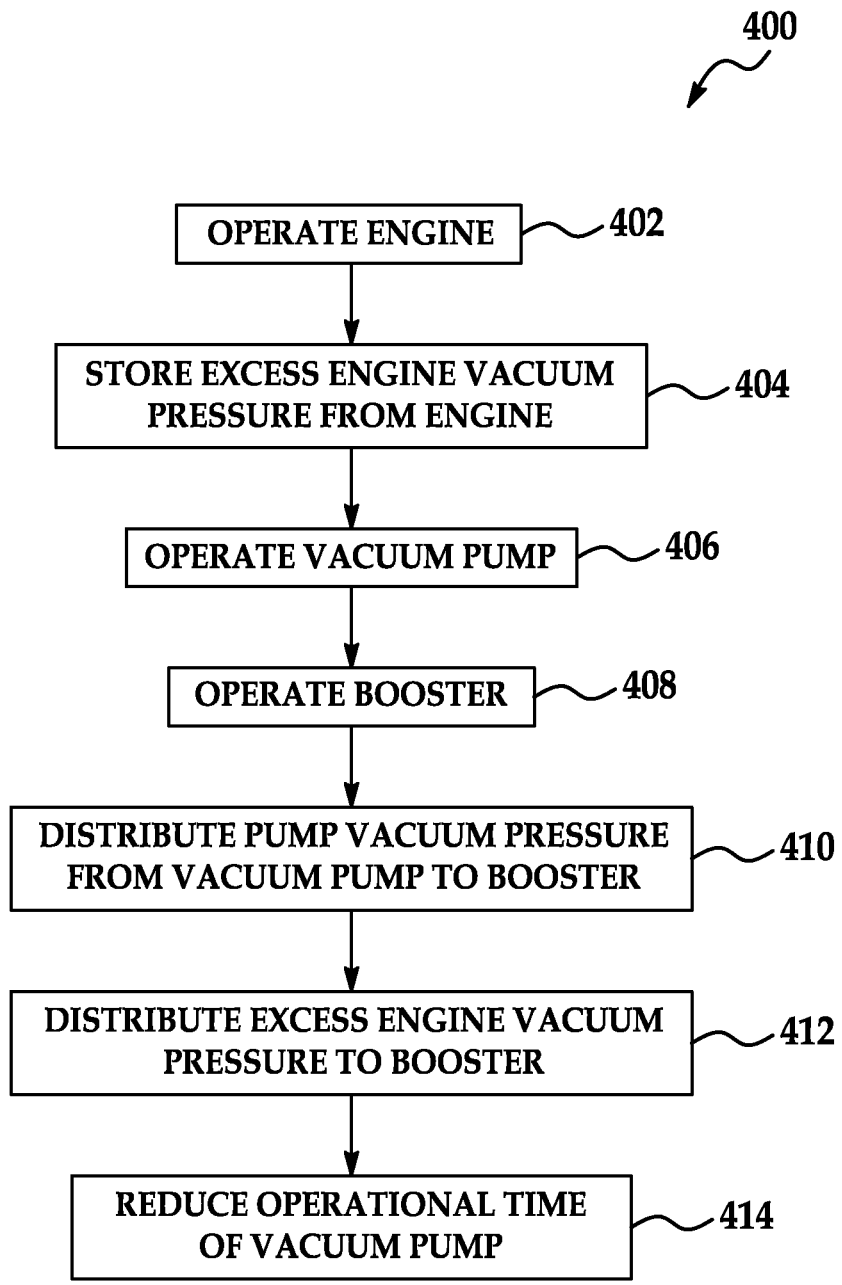
FIG. 3 is a flow diagram which illustrates an illustrative embodiment of a vacuum accumulator method for a regenerative braking system.

Referring next to FIG. 2, another alternative illustrative embodiment of the vacuum accumulator system is generally indicated by reference numeral 1a. The vacuum accumulator system 1a may include a connecting vacuum conduit 26 which connects the engine vacuum conduit 3 to the pump vacuum conduit 15. A connecting conduit check valve 27 may be provided in the connecting vacuum conduit 26. The accumulator vacuum conduit 9 may connect the accumulator outlet 8b of the vacuum accumulator 8 to the pump vacuum conduit 15.

In some embodiments, a connecting vacuum conduit 30 may optionally connect the pump vacuum conduit 15 to the engine vacuum conduit 3. A bypass conduit 32 (shown in phantom) may optionally connect the pump vacuum conduit 15 to the connecting vacuum conduit 30 between the vacuum pump outlet 14a and the vacuum pump check valve 16. A connecting conduit check valve 31 may be provided in the connecting vacuum conduit 30 to prevent dissipation of combined engine/pump vacuum pressure 18 in the connecting vacuum conduit 30. Accordingly, multiple configurations of the vacuum accumulator system 1a are possible with regard to the presence or absence of the connecting conduit check valve 31 in the connecting conduit 30 and/or the vacuum pump check valve 16 in the pump vacuum conduit 15. In a first configuration, both the vacuum pump check valve 16 and the connecting conduit check valve 31, with the connecting conduit 30 and the bypass conduit 32, may be omitted from the vacuum accumulator system 1. In a second configuration, the vacuum pump check valve 16 may be provided in the pump vacuum conduit 15 while the connecting conduit check valve 31, the connecting conduit 30 and the bypass conduit 32 may be omitted from the vacuum accumulator system 1. In a third configuration, the vacuum pump check valve 16 may be omitted from the pump vacuum conduit 15 while the connecting vacuum conduit 30 and the connecting conduit check valve 31 may be provided in the vacuum accumulator system 1. In a fourth configuration, both the vacuum pump check valve 16 may be provided in the pump vacuum conduit 15 and the connecting conduit check valve 31 may be provided in the connecting vacuum conduit 30, while the bypass conduit 32 connects the pump vacuum conduit 15 to the connecting vacuum conduit 30 at a point between the vacuum pump outlet 14a of the vacuum pump 14 and the vacuum pump check valve 16. In a fifth configuration, both the vacuum pump check valve 16 may be provided in the pump vacuum conduit 15 and the connecting conduit check valve 31 may be provided in the connecting vacuum conduit 30, while the bypass conduit 32 is omitted; in that case, the pump vacuum conduit 15 is connected to the connecting vacuum conduit 30 between the vacuum pump check valve 16 and the booster check valve 21.

In typical operation of the vacuum accumulator system 1a, during operation of the engine 2, engine vacuum pressure 5 is distributed through the engine vacuum conduit 3 into the accumulator inlet 8a of the vacuum accumulator 8. Throughout operation of the engine 2, the vacuum accumulator 8 accumulates the engine vacuum pressure 5, forming the accumulator vacuum pressure 11. Also throughout operation of the engine 2, engine vacuum pressure 5 is simultaneously distributed from the engine vacuum conduit 3 to the pump vacuum conduit 15 through the connecting vacuum conduit 26.

Under circumstances in which the booster 20 requires booster vacuum pressure 24 for operation of the regeneration braking system (not shown), the accumulator vacuum conduit 9 distributes the accumulator vacuum pressure 11 from the accumulator outlet 8b of the accumulator 8 to the pump vacuum conduit 15. The vacuum pump 14 may simultaneously be operated to generate pump vacuum pressure 17 which augments the engine vacuum pressure 5 from the connecting vacuum conduit 26 to form combined engine/pump vacuum pressure 18. In the pump vacuum conduit 15, the accumulator vacuum pressure 11 from the accumulator vacuum conduit 9 may augment the combined engine/pump vacuum pressure 18 to form the booster vacuum pressure 24. Accordingly, the operational run time of the vacuum pump 14 can be reduced in order to conserve power while maintaining the necessary booster vacuum pressure 24 for optimum operation of the booster 20. In applications in which the vacuum pump check valve 16 is provided in the pump vacuum conduit 15 and the connecting vacuum conduit 30, the connecting conduit check valve 31 and the bypass conduit 32 are omitted from the vacuum accumulator system 1, the vacuum pump check valve 16 may prevent dissipation of vacuum pressure in the pump vacuum conduit 15.

In applications in which the vacuum pump check valve 16 is omitted from the pump vacuum conduit 15 and the connecting conduit 30 connects the pump vacuum conduit 15 and the engine vacuum conduit 3 and the connecting conduit check valve 31 is provided in the connecting conduit 30, the connecting conduit check valve 31 may open when the pump vacuum pressure 17 in the connecting vacuum conduit 30 exceeds a predetermined value (such as 0.7 bar, for example and without limitation). The connecting vacuum conduit 30 with connecting conduit check valve 31 may enable the vacuum pump 14 to evacuate the accumulator 8 after the pump vacuum pressure 17 initially applied to the booster 20 has reached the predetermined value (such as 0.7 bar, for example and without limitation). In applications in which the bypass conduit 32 connects the pump vacuum conduit 15 with the connecting conduit 30 at a point which is between the vacuum pump outlet 14a and the vacuum pump check valve 16, pump vacuum pressure 17 may be distributed from the connecting vacuum conduit 30 to the pump vacuum conduit 15 upstream of the vacuum pump check valve 16. In applications in which the bypass conduit 32 is omitted, the pump vacuum pressure 17 enters the connecting vacuum conduit 30 downstream of the vacuum pump check valve 16.

Referring next to FIG. 4, a flow diagram 400 which illustrates an illustrative embodiment of a vacuum accumulator method for a regenerative braking system is shown. In block 402, an engine is operated. In block 404, excess engine vacuum pressure from the engine is stored and accumulated. In block 406, a vacuum pump is operated. In block 408, a booster of a braking system is operated. In block 410, pump vacuum pressure is distributed from the vacuum pump to the booster. In block 412, accumulated excess engine vacuum pressure is distributed to the booster. In block 414, the operational time or duration of the vacuum pump is reduced in proportion to the magnitude of excess engine vacuum pressure which is distributed to the booster in block 412.

While the preferred embodiments of the disclosure have been described above, it will be recognized and understood that various modifications can be made and the appended claims are intended to cover all such modifications which may fall within the spirit and scope of the disclosure.

What is claimed is:

1. A vacuum accumulator system, comprising:
a booster;
a vacuum accumulator disposed in fluid communication with said booster;
an engine disposed in fluid communication with said vacuum accumulator;
a vacuum pump disposed in fluid communication with said booster;
an accumulator vacuum conduit connecting said vacuum accumulator and said booster, an engine vacuum conduit connecting said engine and said vacuum accumulator and a pump vacuum conduit connecting said vacuum pump and said boosters; and
a vacuum conduit connecting said engine vacuum conduit and said accumulator vacuum conduit.

2. The vacuum accumulator system of claim 1 further comprising a vacuum pump check valve between said vacuum pump and said booster.

3. The vacuum accumulator system of claim 1 further comprising an engine vacuum conduit check valve provided in said engine vacuum conduit and a vacuum accumulator check valve provided in said accumulator vacuum conduit.

4. The vacuum accumulator system of claim 1 further comprising a vacuum pump check valve provided in said pump vacuum conduit.

5. The vacuum accumulator system of claim 1 further comprising a connecting conduit check valve provided in said connecting vacuum conduit.

6. The vacuum accumulator system of claim 1 further comprising a vacuum accumulator check valve between said vacuum accumulator and said booster.

7. The vacuum accumulator system of claim 1 further comprising a vacuum conduit check valve between said engine and said vacuum accumulator.

8. A vacuum accumulator system, comprising:
a booster;

a pump vacuum conduit disposed in fluid communication with said booster;
a vacuum pump disposed in fluid communication with said pump vacuum conduit;
a vacuum accumulator disposed in fluid communication with said pump vacuum conduit;
an engine disposed in fluid communication with said vacuum accumulator;
a check valve between said engine and said vacuum accumulator;
an engine vacuum conduit connecting said engine and said vacuum accumulator and wherein said check valve between said engine and said vacuum accumulator is provided in said engine vacuum conduit;
a connecting vacuum conduit connecting said engine vacuum conduit and said pump vacuum conduit; and
a connecting conduit check valve provided in said connecting vacuum conduit.

9. The vacuum accumulator system of claim 8 further comprising a vacuum accumulator check valve between said vacuum accumulator and said pump vacuum conduit.

10. The vacuum accumulator system of claim 8 further comprising a diverting vacuum conduit connecting said connecting vacuum conduit and said pump vacuum conduit.

* * * * *